US008661194B2

(12) United States Patent
Nam

(10) Patent No.: US 8,661,194 B2
(45) Date of Patent: Feb. 25, 2014

(54) CACHE CONTROL METHOD FOR HYBRID HDD, RELATED PROGRAM, AND HYBRID DISK DRIVE USING SAME

(75) Inventor: Hye-jeong Nam, Seongnam-si (KR)

(73) Assignee: Seagate Technology LLC, Cupertino, CA (US)

( * ) Notice: Subject to any disclaimer, the term of this patent is extended or adjusted under 35 U.S.C. 154(b) by 387 days.

(21) Appl. No.: 11/702,091

(22) Filed: Feb. 5, 2007

(65) Prior Publication Data

US 2007/0186039 A1 Aug. 9, 2007

(30) Foreign Application Priority Data

Feb. 3, 2006 (KR) ........................ 10-2006-0010638

(51) Int. Cl.
*G06F 12/02* (2006.01)
(52) U.S. Cl.
USPC ................... 711/113; 711/154; 711/E12.044; 711/E12.055
(58) Field of Classification Search
USPC ........................................................ 711/113
See application file for complete search history.

(56) References Cited

U.S. PATENT DOCUMENTS

| 4,723,181 A | * | 2/1988 | Hickok | 360/72.2 |
|---|---|---|---|---|
| 5,584,007 A | * | 12/1996 | Ballard | 711/113 |
| 5,606,529 A | * | 2/1997 | Honma et al. | 711/E12.019 |
| 5,636,355 A | * | 6/1997 | Ramakrishnan et al. | 711/113 |
| 5,734,859 A | * | 3/1998 | Yorimitsu et al. | 711/112 |
| 5,832,262 A | * | 11/1998 | Johnson et al. | 718/102 |
| 5,860,083 A | * | 1/1999 | Sukegawa | 711/103 |
| 5,884,093 A | * | 3/1999 | Berenguel et al. | 711/117 |
| 6,088,262 A | * | 7/2000 | Nasu | 365/185.04 |
| 6,292,878 B1 | * | 9/2001 | Morioka et al. | 711/209 |
| 6,725,342 B1 | * | 4/2004 | Coulson | 711/141 |
| 6,785,767 B2 | * | 8/2004 | Coulson | 711/112 |
| 6,857,052 B2 | * | 2/2005 | Amano | 711/154 |
| 7,694,078 B2 | * | 4/2010 | Setheraman et al. | 711/133 |
| 2004/0225874 A1 | | 11/2004 | Burr et al. | |
| 2005/0125600 A1 | | 6/2005 | Ehrlich | |
| 2007/0016725 A1 | * | 1/2007 | Chu et al. | 711/113 |
| 2008/0024899 A1 | * | 1/2008 | Chu et al. | 360/69 |
| 2008/0282038 A1 | * | 11/2008 | Sethuraman et al. | 711/134 |
| 2009/0119481 A1 | * | 5/2009 | Vishkin | 712/29 |

FOREIGN PATENT DOCUMENTS

JP 08-083148 3/1996

\* cited by examiner

*Primary Examiner* — Alford W. Kindred
*Assistant Examiner* — Daniel Bernard
(74) *Attorney, Agent, or Firm* — Cesari & Reed, LLP; Kirk A. Cesari

(57) ABSTRACT

A cache control method for a hybrid hard disk drive (HDD) comprising a nonvolatile cache (NVC) and a hard disk. When the hybrid HDD is operating in a non-parallel mode of operation, the control method sequentially searches the NVC and then reads the hard disk for requested data, but when the hybrid HDD is operating in a parallel mode of operation, the control method simultaneously searches the NVC and reads hard disk for the data requested.

14 Claims, 3 Drawing Sheets

CACHE CONTROL METHOD FOR HYBRID HDD, RELATED PROGRAM, AND HYBRID DISK DRIVE USING SAME

BACKGROUND OF THE INVENTION

1. Field of the Invention

The present invention relates to a hybrid hard disk drive, and a related cache control method and program. More particularly, the invention relates to a cache control method increasing data access speed by simultaneously searching a nonvolatile cache and reading a hard disk.

This application claims the benefit of Korean Patent Application No. 10-2006-0010638, filed on Feb. 3, 2006, the subject matter of which is hereby incorporated by reference.

2. Description of the Related Art

A hybrid hard disk drive (HDD) includes a hard disk storage capability of a conventional HDD and a nonvolatile cache (NVC). The NVC is commonly implemented using flash memory.

Compared to conventional disk-only HDDs, the hybrid HDD has several notable advantages. First, the boot time for a host system incorporating the hybrid HDD may be reduced since an initial (or boot) set of data files from the host system may be quickly copied into the NVC rather than being written to the hard disk. In a disk-only HDD, this boot file downloading is slowed by the period of time required to spin-up the spindle motor rotating the disk to its operational speed. However, a host system using a hybrid HDD may download its boot files to the NVC without waiting for the spindle motor to reach its operating rotational speed.

Additionally, the data access time provided by a hybrid HDD is generally quicker than that provided by disk-only HDDs. That is, a host system using a hybrid HDD may store data in either or both of the NVC and hard disk. When data is subsequently read, the host system first searches the NVC for the data and if it is located in the NVC, it may be directly read from the NVC without requirement to search the hard disk. Since, recently recorded data has a higher access frequency than older data, it may be stored in the NVC to thereby reduce overall data access time.

Like conventional disk-only HDDs, the hybrid HDD may include a dynamic random access memory (DRAM) cache in addition to a NVC and a hard disk. The DRAM cache may be used as a buffer for data communicated between the hybrid HDD and host system. Thus, when a read request from the host system results in a "full hit" (i.e., identification of all of the requested data) within the DRAM cache, data may be communicated to the host system at the highest relative access speed. In contrast, when a hit occurs relative to data stored in the NVC, such data must first be communicated to the DRAM cache and subsequently communicated to the host system.

Thus, conventional hybrid HDDs typically access (i.e., look for and obtain) data in an ordered manner progressing from the DRAM cache, to the NVC, and finally to the hard disk. This sequential data access approach makes use of the relative data processing speeds for these three media. However, requested data stored in only the hard disk will only be searched for after first searching the DRAM cache and the NVC. Where a certain percentage of data hits occurs in the hard disk, as opposed to the DRAM cache and NVC, overall data access speed will suffer from the overhead requirement of caches-first searching.

Assuming a worst case scenario, the total time required to run a DRAM cache search, a NVC search, spin-up the spindle motor and access data stored on the hard drive, and then communicate the data to the DRAM cache may add up to several milliseconds. For several emerging HDD applications, such access delays are simply unacceptable.

SUMMARY OF THE INVENTION

Embodiments of the invention provide a cache control method and program, as well as a hybrid hard disk drive (HDD), designed to decrease total data access time In one embodiment, the invention provides a cache control method for a hybrid hard disk drive (HDD) comprising a nonvolatile cache (NVC) and a hard disk, the cache control method comprising; when the hybrid HDD is operating in a non-parallel mode of operation, sequentially searching the NVC and then reading the hard disk for requested data; and when the hybrid HDD is operating in a parallel mode of operation, simultaneously searching the NVC and reading hard disk for the data requested.

In another embodiment, the invention provides a computer-readable recording medium storing a program, the program implementing a cache control method for a hybrid hard disk drive (HDD) comprising a nonvolatile cache (NVC) and a hard disk, the cache control method comprising; when the hybrid HDD is operating in a non-parallel mode of operation, sequentially searching the NVC and then reading the hard disk for requested data; and when the hybrid HDD is operating in a parallel mode of operation, simultaneously searching the NVC and reading hard disk for the data requested.

In another embodiment, the invention provides a hybrid hard disk drive (HDD) comprising; a nonvolatile cache (NVC), a hard disk, and a controller adapted to sequentially search the NVC and then read the hard disk for requested data when the hybrid HDD is operating in a non-parallel mode of operation, but simultaneously search the NVC and read hard disk for the data requested when the hybrid HDD is operating in a parallel mode of operation in response to a read command received from a host system.

DESCRIPTION OF EMBODIMENTS

Figure 1:
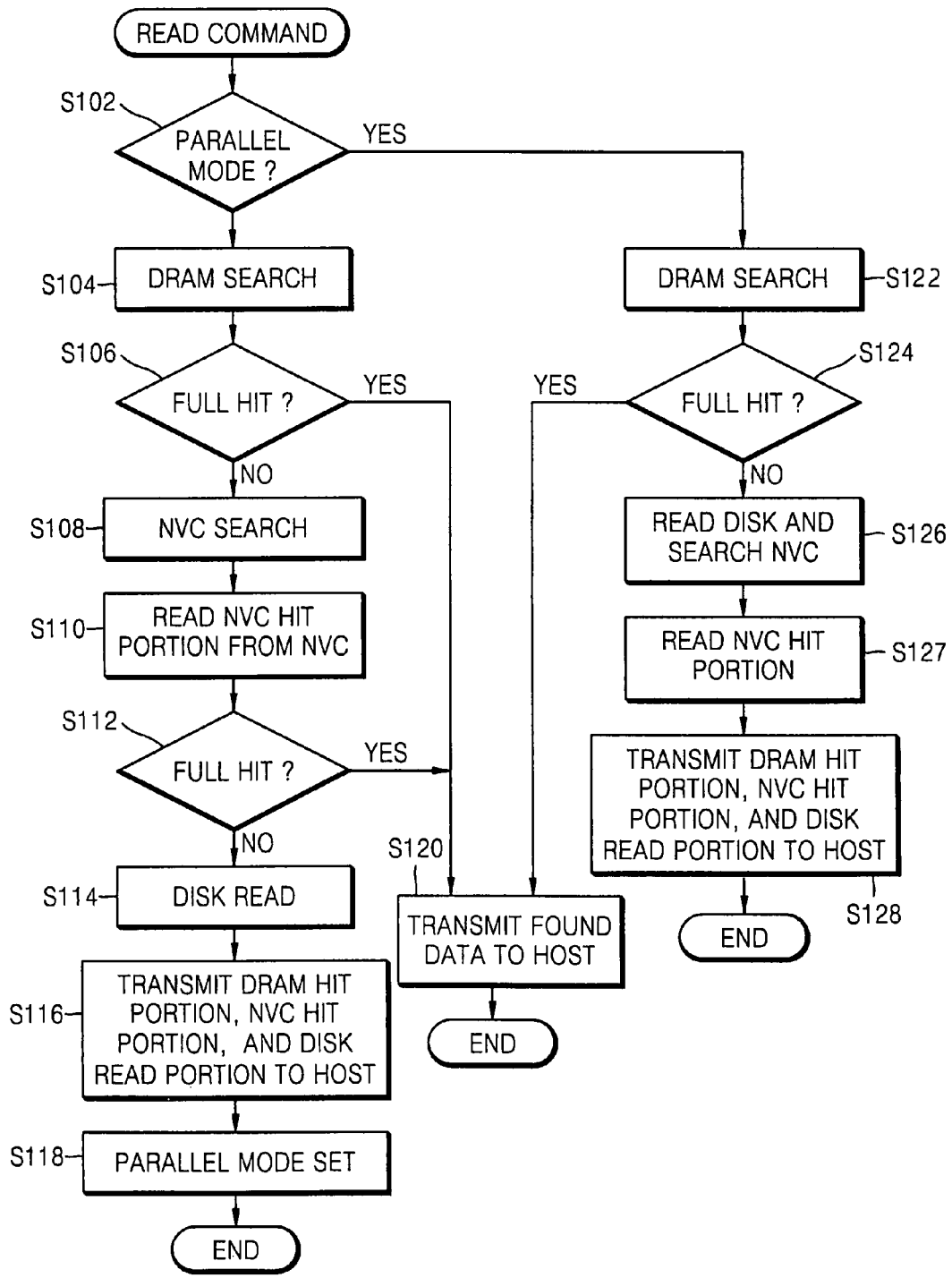
FIG. 1 is a flowchart illustrating a cache control method according to an embodiment of the present invention.

Embodiments of the present invention will now be described in some additional detail with reference to the accompanying drawings. The invention may, however, be embodied in many different forms and should not be construed as being limited to only the embodiments set forth herein. Rather, these embodiments are presented as teaching examples. Throughout the written specification and drawings, like reference numerals are used to refer to like or similar elements.

In embodiments of the invention, data access time may be reduced by simultaneously searching a nonvolatile cache (NVC) and reading a hard disk for requested data (i.e., data identified in a read request from the host device) in relation to certain types of access operations. However, simultaneously searching the NVC and the reading hard disk in response to all data access operations is inefficient and may unduly increase power consumption by the HDD. For example, when a full hit occurs for data stored in the NVC, the power consumed by simultaneously spinning-up the spindle motor in anticipation of a hard disk data search is simply wasted.

Thus, a determination and timing of a simultaneous search operation for the NVC and reading the hard disk is a very important design consideration. For example, in one embodiment of the invention, a simultaneous operation of searching NVC and reading the hard disk occurs only when hard disk is already activated (i.e., the spindle motor is already running above some threshold speed). However, when the spindle is down, the simultaneous search operation is not performed.

Thus, within the context of embodiments of the invention, certain conditions may be used to define a "parallel mode" of operation for simultaneously searching NVC and reading the hard disk of a hybrid HDD. Absent such conditions, the hybrid HDD runs in a non-parallel mode of operation in which NVC is searched and hard disk is read sequentially.

To understand this approach, a use example will be described. In this use example, we note that certain data files are almost always required to boot a host system. Such boot files are commonly stored in the NVC portion of a hybrid HDD. In the use example, the boot files are stored in the NVC in response to an 'Add LBA to NVC' command. By storing the boot files in the NVC, the host system may be more rapidly booted up as no access to data stored in the hard disk is required. Thus, all of the data initially requested by the host system may be found in the NVC during a predetermined time period following power on of host system.

However, as further data requests are influenced by the user of the host system or other externalities, the probability of a request for data stored on the hard disk, rather than the NVC, increases. This increasing probability depends on the nature and operation of the host system, the access frequency to stored data, and the relative data storage capacity of the NVC.

Once a data requested by the host system for data not found in the NVC arises, the probability of additional requests for data not stored in the NVC becomes significantly high. This first "hard disk-stored data request" causes activation of the hard disk (e.g., the spindle motor is spun-up, a read/write head actuator is un-parked, etc.). At this juncture, initiation of a parallel mode of operation wherein the searching NVC and reading hard disk are simultaneously occurred for requested data. This parallel mode of operation may persist until some concluding event is noted. For example, a parallel mode of operation may persist in a hybrid HDD until the hard disk is turned OFF (e.g., enters a stand-by state, or a dormant state) due to disuse, a power conservation instruction, etc.

In a parallel mode of operation, since several milliseconds are required to access the hard disk, the NVC will search during this time period for the requested data. If a full hit occurs in the NVC, the resulting data may be communicated to the DRAM cache for consumption by the host system. Where a full hit to data stored in the NVC occurs, all data read from the hard disk, if any, will be discarded and the ongoing read of the hard disk will be terminated.

However, there may be partial hits to data stored in the NVC. That is, some but not all of the requested data is found in the NVC and some of the requested data is found in the hard disk. In such circumstances, some overlap of data between the NVC and hard disk occurs. The overlapping data from the hard disk may be discarded and the full block of requested data communicated from the hard disk to the DRAM cache and then to the host system.

FIG. 1 is a flowchart illustrating a cache control method according to an embodiment of the present invention. This cache control method may be implemented within a hybrid HDD using executable software running on the computational resources (e.g., a microprocessor, ASIC or micro-controller and related circuits) provided by the hybrid HDD and/or various host system components. In FIG. 1, an exemplary parallel mode of operation may be initiated on the basis of one or more defined conditions, such as the present operating state of the hard disk (e.g., active or inactive). In the parallel mode of operation both a NVC and a hard disk may be simultaneously searched for requested data.

Referring to FIG. 1, when a read command is received from the host system, a determination is made as to the mode of parallel verses non-parallel operation (S102). If the parallel mode is not called for (e.g., the hard disk is currently inactive), a non-parallel mode of operation conducts a sequential search for the requested data.

The particular manner by which the various data storage components of the hybrid HDD are searched is not limiting to the present invention. Information regarding one exemplary approach to searching a hybrid HDD may be found, for example, in an article entitled "NV Cache Command Proposal" dated Dec. 2, 2005 and posted at http://www.t13.org/#Project. Exemplary NV Cache commands may be understood from materials provided in ATA8-ACS. Referring to ATA8-ACS, for example, an NV Cache command set related to the NV Cache commands includes an NV Cache Pinned Set of which data recorded in the NVC by the host system and an NV Cache Unpinned Set, which is not included in the NV Cache Pinned Set.

Returning to FIG. 1, the non-parallel mode of operation begins with a search of the DRAM cache (S104). If all of the requested data is located in the DRAM cache (i.e., a full hit occurs S106), the data is then communicated to the host device (S120).

However, if a full hit does not occur in the DRAM cache, the NVC is searched (S108). If all of the requested data is located in the NVC (i.e., a full hit occurs S112), the data is then communicated to the host device (S120).

However, if a full hit does not occur in the NVC, the hard disk is read (S114). At this point, assuming a read error has not occurred, all of the requested data has been located in either the DRAM cache, the NVC, and/or the hard disk. After accounting for overlapping data, the requested data is communicated to the host system (S116). Further, access to the hard disk (S114) results in activation of the hard disk and entry into the parallel mode of operation for subsequent read requests (S118).

If, however, the hybrid HDD is currently in the parallel mode of operation upon receiving a read request, the DRAM cache is first searched (S122). If a full hit occurs in the DRAM cache, the requested data is communicated to the host device (S120).

In the absence of a full hit in the DRAM cache, however, a simultaneous search of the NVC and reading hard disk is conducted (S126). The requested data may be located wholly or partially within the DRAM cache, NVC, and/or hard disk. Assuming some portion of the requested data is stored in the NVC, such data is read (S127) and overlapping data, if any, is accounted for before communicating the requested data to the host system (S128).

Figure 2:
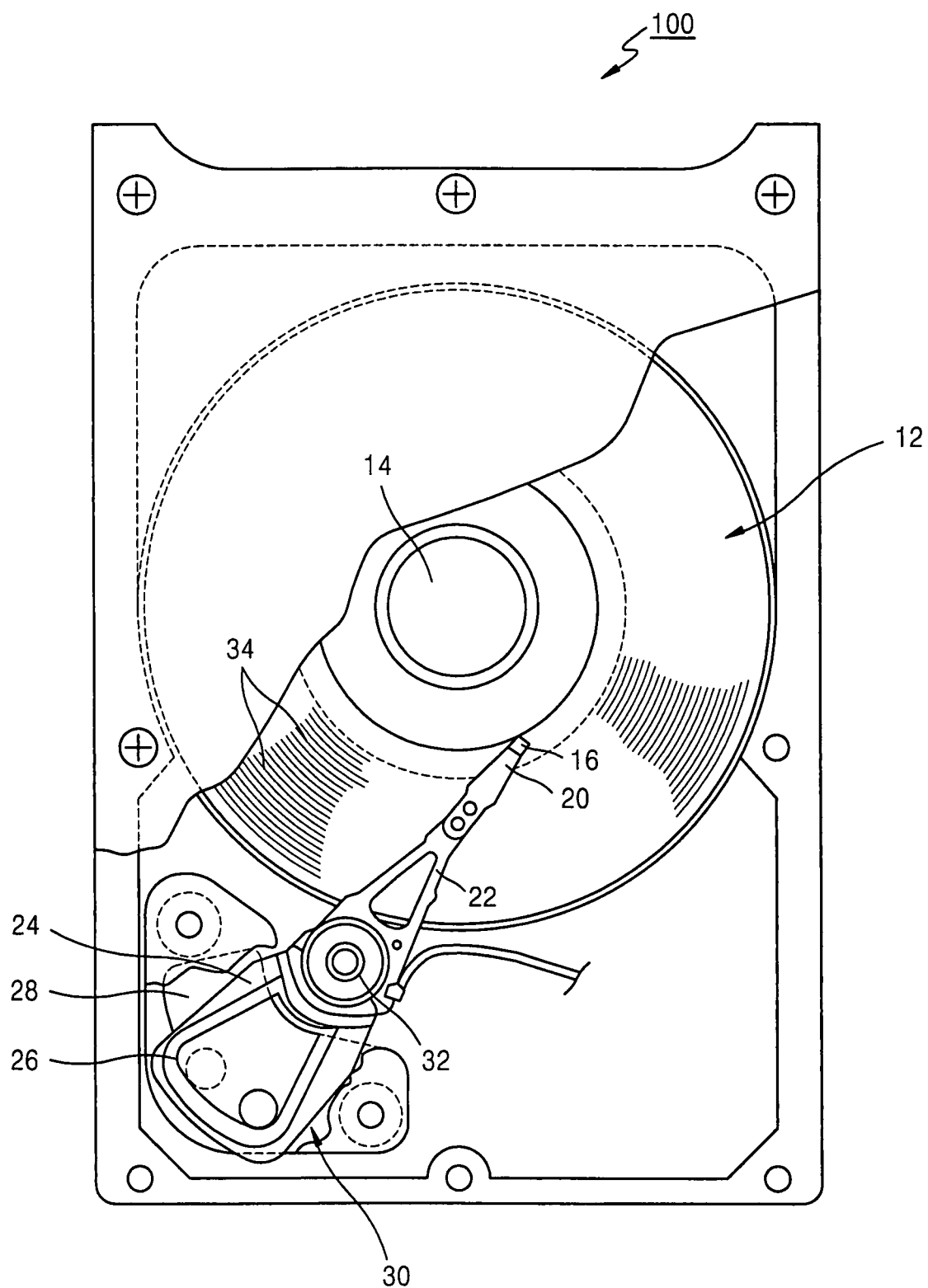
FIG. 2 is a plan view of a hybrid HDD according to an embodiment of the present invention.

FIG. 2 is a plan view of an exemplary hybrid HDD 100 susceptible to the benefits afforded by embodiments of the invention. Referring to FIG. 2, hybrid HDD 100 includes at least one disk 12 rotated by a spindle motor 14. Hybrid HDD 100 also includes a read/write head 16 floating above the surface of disk 12.

Head 16 may be adapted to read data from and/or write data to disk 12 by respectively sensing a magnetic field from the surface of disk 12 or magnetizing the surface of disk 12. Though a single head 16 is shown in FIG. 2, head 16 may include a separate write head.

Head 16 is mounted on a slider (not shown). The slider generates an air bearing between head 16 and the surface of disk 12. The slider is combined with a suspension 20. Suspension 20 is combined with a head stack assembly (HSA) 22. HSA 22 is attached to an actuator arm 24 having a voice coil 26. Voice coil 26 is located adjacent to a magnetic assembly 28 supporting a voice coil motor (VCM) 30. A VCM driving current supplied to voice coil 26 generates a driving force which rotates actuator arm 24 around a bearing assembly 32. The rotation of actuator arm 24 moves head 16 over the surface of disk 12.

Figure 3:
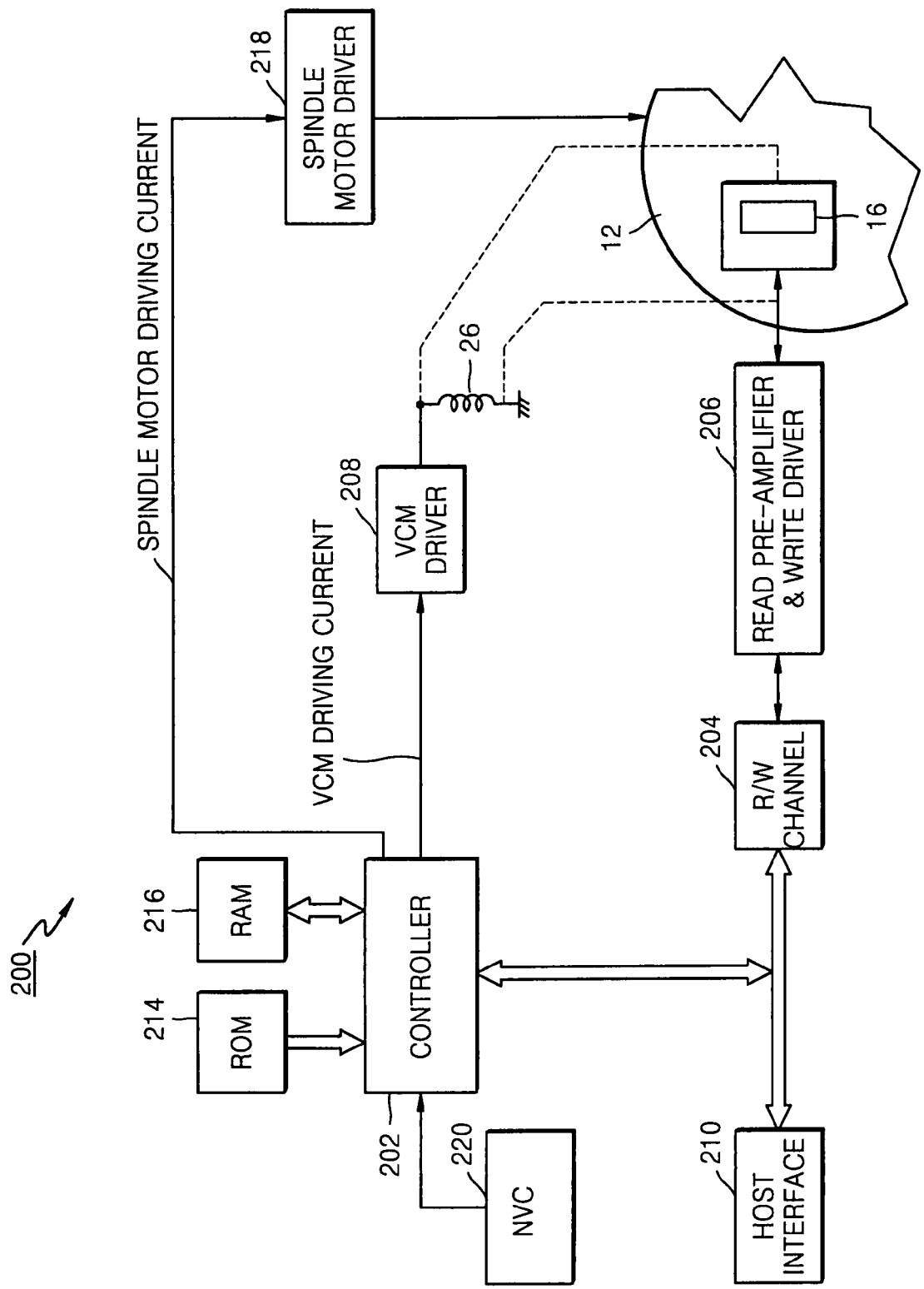
FIG. 3 is a block diagram of a control system for controlling the hybrid HDD of FIG. 2.

FIG. 3 is a block diagram of an exemplary control system 200 which may be adapted for use in hybrid HDD 100 of FIG. 2.

Referring to FIG. 3, control system 200 includes a controller 202 connected to head 16 through a read/write (R/W) channel circuit 204 and a read pre-amplifier & write driver circuit 206. Controller 202 may be implemented as a digital signal processor (DSP), a microprocessor, or a micro-controller, etc. Controller 202 provides a control signal to the RAN channel circuit 204 to read data from or write data to disk 12.

Data is typically communicated from R/W channel circuit 204 to a host interface circuit 210. A data buffering operation is performed among host interface circuit 210, NVC 220, a DRAM cache (not shown), and R/W channel circuit 204. The DRAM cache may be implemented as a DRAM buffer which may be operationally interposed between host interface circuit 210 and R/W channel circuit 204 and may be installed inside host interface circuit 210. Host interface circuit 210 includes a control circuit (not shown) for interfacing with a host system (not shown) such as a personal computer (PC).

R/W channel circuit 204 modulates an analog signal read by head 16 and amplified by read pre-amplifier & write driver circuit 206 into a host computer-readable digital signal and outputs the digital signal to host interface circuit 210, or RAN channel circuit 204 converts data received via host interface circuit 210 to a disk-recordable write current and outputs the write current to read pre-amplifier & write driver circuit 206.

Controller 202 is also connected to a VCM driver 208 supplying a driving current to voice coil 26. Controller 202 provides a control signal to VCM driver 208 to control the activation of VCM 30 and the motion of head 16. Controller 202 is also connected to a read only memory (ROM) 214 and a random access memory (RAM) 216. The ROM 214 is a nonvolatile memory. Memories 214 and 216 may be used to store instructions and data, which are used by controller 202 to execute software routines implementing the control method.

In particular, one or more software routines may be used to implement an executable program controlling data access to the hybrid HDD according to an embodiment of the invention. Controller 202 may be used to determine whether or not a parallel mode of operation exists within the hybrid HDD and to implement a control method such as the one illustrated in FIG. 1.

If the parallel mode of operation is not "set", controller 202 sequentially searches for the requested data in the DRAM cache, NVC 220, and then hard disk 12. However, if the parallel mode of operation is set, controller 202 first searches the DRAM cache, and then simultaneously searches NVC 220 and reads hard disk 12 for the requested data.

When hybrid HDD 100 is reset (e.g., by entering a stand-by state or turning OFF), controller 202 terminates the parallel mode of operation, if it is set. Then, following a subsequent boot operation, the control method returns to its beginning state and continues forward as described above.

The foregoing control method and program, as well as a hybrid HDD incorporating same provides improved data access speed while at the same time husbanding power consumption.

Embodiments of the invention may be implemented and realized as a control method, a related program, a hybrid HDD, and/or a host system incorporating such a hybrid HDD. Where an embodiment of the invention is implemented in software, wholly or in part, one or more components of the embodiment may be embodied in executable code segments. A program containing such code segments may be stored in a computer readable recording medium. Examples of computer readable recording medium include electronic circuits, semiconductor memory devices, read-only memory (ROM), flash memory, erasable ROM, floppy disks, optical discs, and hard disks.

While the present invention has been particularly shown and described with reference to exemplary embodiments thereof, it will be understood by those of ordinary skill in the art that various changes in form and detail may be made therein without departing from the scope of the present invention as defined by the following claims.

What is claimed is:

1. A method comprising:
determining whether a hybrid data storage device (HDSD) is in a non-parallel mode of operation or a parallel mode of operation,
when the HDSD is operating in the non-parallel mode of operation, searching a non-volatile cache (NVC) for requested data, retrieving the requested data from a second non-volatile memory when the requested data is not found in the NVC and setting the HDSD to operate in the parallel mode of operation for a next data retrieval request when the requested data has been retrieved from the second non-volatile memory; and
when the HDSD is operating in the parallel mode of operation, simultaneously searching the NVC for the requested data and retrieving the requested data from the second non-volatile memory.

2. The method of claim 1, wherein upon determining that all of the requested data exists in the NVC during the parallel mode of operation, terminating simultaneous retrieval from the second non-volatile memory.

3. The method of claim 1, wherein the HDSD further comprises a DRAM cache, and prior to searching the NVC and the second non-volatile memory when the HDSD is operating in the non-parallel mode of operation, searching the DRAM cache for the requested data.

4. The method of claim 1, wherein the HDSD further comprises a DRAM cache, and prior to searching the NVC and the second non-volatile memory when the HDSD is operating in the parallel mode of operation, searching the DRAM cache for the requested data.

5. The method of claim 1, wherein when operating in the parallel mode of operation, terminating the parallel mode of operation and implementing the non-parallel mode of operation when power to the HDSD is reset.

6. The method of claim 1, wherein the determination of whether the HDSD is in the non-parallel mode of operation or the parallel mode of operation is made in relation to a current operating condition of the second non-volatile memory.

7. The method of claim 6, wherein the current operating condition of the second non-volatile memory is defined in relation to a rotational speed for a spindle motor.

8. A memory device storing instructions, that when executed by a processor cause the processor to perform a method comprising:
  determining whether a data storage device having multiple non-volatile storage media (DSD) is operating in a non-parallel mode of operation or a parallel mode of operation,
  when the DSD is operating in the non-parallel mode of operation, sequentially searching for requested data in a first non-volatile memory having a non-volatile cache (NVC) and, if the requested data is not found in the NVC then retrieving the requested data from a second non-volatile memory; and
  when the DSD is operating in the parallel mode of operation, simultaneously searching the NVC for the requested data and retrieving the requested data from the second non-volatile memory; and
  selectively implementing the non-parallel mode of operation and the parallel mode of operation by setting the DSD to operate in the non-parallel mode of operation upon startup of the DSD and setting the DSD to operate in the parallel mode of operation when the requested data has been retrieved from the second non-volatile memory.

9. The memory device of claim 8, wherein upon determining that all of the requested data exists in the NVC during the parallel mode of operation, terminating simultaneous retrieval from the second non-volatile memory prior to retrieval of all the requested data from the second non-volatile memory.

10. The memory device of claim 8, wherein the DSD further comprises a DRAM cache, and the method further includes searching the DRAM cache for the requested data prior to searching the NVC or the second non-volatile memory.

11. An apparatus comprising:
  a first nonvolatile memory device;
  a second nonvolatile memory device;
  a controller adapted to selectively implement a non-parallel mode of operation and a parallel mode of operation,
  wherein the controller is further adapted to sequentially search the first nonvolatile memory device for data and, if the data is not found in the first nonvolatile memory device then search the second nonvolatile memory device for the data when the apparatus is selected to be operating in the non-parallel mode of operation,
  wherein, when the apparatus is operating in the parallel mode of operation, the controller is adapted to simultaneously search the first nonvolatile memory device for the data and search the second nonvolatile memory device for the data; and
  implementing the parallel mode of operation by setting the apparatus to operate in the parallel mode of operation when the data has been retrieved from the second nonvolatile memory.

12. The apparatus of claim 11, wherein, when the apparatus is operating in the parallel mode of operation, the controller is further adapted to terminate the search of the second nonvolatile memory device when the apparatus determines that all of the data exists in the first nonvolatile memory device.

13. The apparatus of claim 11 further comprising a DRAM cache, wherein the controller is further adapted to search the DRAM cache prior to searching the first nonvolatile memory device and the second nonvolatile memory device.

14. The apparatus of claim 13, wherein the controller is further adapted to select the parallel mode of operation after sequentially searching the DRAM cache, the first nonvolatile memory device, and the second nonvolatile memory device when the hybrid HDD is operating in the non-parallel mode of operation and at least a portion of the data is retrieved from the second nonvolatile memory.

* * * * *